US010268279B2

(12) United States Patent
Shen et al.

(10) Patent No.: US 10,268,279 B2
(45) Date of Patent: *Apr. 23, 2019

(54) DETECTION OF USER GESTURES (71) Applicant: EMPIRE TECHNOLOGY DEVELOPMENT LLC, Wilmington, DE (US)

(72) Inventors: Zhen Shen, Beijing (CN); Qi Li, Beijing (CN); Xuefeng Song, Hebei (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,465

(22) Filed: Jul. 24, 2017

(65) Prior Publication Data
US 2017/0322633 A1 Nov. 9, 2017

Related U.S. Application Data (63) Continuation of application No. 14/422,287, filed as application No. PCT/CN2013/075602 on May 14, 2013, now Pat. No. 9,740,295.

(51) Int. Cl.
*G06F 3/01* (2006.01)
*G06F 3/042* (2006.01)
(Continued)

(52) U.S. Cl.
CPC .............. *G06F 3/017* (2013.01); *G06F 3/005* (2013.01); *G06F 3/0416* (2013.01);
(Continued)

(58) Field of Classification Search
CPC ........ G06F 3/017; G06F 3/0416; G06F 3/005; G06F 3/0425; G06F 2203/04804;
(Continued)

(56) References Cited

U.S. PATENT DOCUMENTS

| 6,795,241 B1 | 9/2004 | Holzback |
| 2008/0143682 A1 | 6/2008 | Shim et al. |

(Continued)

FOREIGN PATENT DOCUMENTS

| CN | 102317899 A | 1/2012 |
| CN | 102426480 A | 4/2012 |

OTHER PUBLICATIONS

Benko, H. and Wilson, A. D., "DepthTouch: Using Depth-Sensing Camera to Enable Freehand Interactions On and Above the Interactive Surface," Microsoft Research, Technical Report, MSR-TR-2009-23, pp. 8, IEEE Tabletops and Interactive Surfaces, 2008.

(Continued)

*Primary Examiner* — Premal R Patel (57) ABSTRACT

In one example, a system may include a display including a display screen; a display controller configured to display visual information on the display screen of the display screen, control at least portions of one or more pixels corresponding to the display screen to render the display screen transparent; and a depth camera, positioned behind the display screen, that is configured to obtain depth image information of one or more objects in front of the display screen when at least portions of the one or more pixels are rendered transparent.

20 Claims, 8 Drawing Sheets

(51) Int. Cl.
*G06F 3/00* (2006.01)
*G06K 9/00* (2006.01)
*G06F 3/041* (2006.01)

(52) U.S. Cl.
CPC ....... *G06F 3/0425* (2013.01); *G06K 9/00201* (2013.01); *G06K 9/00335* (2013.01); *G06F 2203/04101* (2013.01); *G06F 2203/04804* (2013.01)

(58) Field of Classification Search
CPC ...... G06F 2203/04101; G06K 9/00335; G06K 9/00201
See application file for complete search history.

(56) References Cited

U.S. PATENT DOCUMENTS

| | | |
|---|---|---|
| 2009/0219253 A1 | 9/2009 | Izadi |
| 2009/0321728 A1 | 12/2009 | Seo |
| 2010/0060722 A1 | 3/2010 | Bell |
| 2010/0309144 A1 | 12/2010 | Tsai et al. |
| 2011/0026765 A1* | 2/2011 | Ivanich ................ H04N 5/4403 382/103 |
| 2011/0148822 A1 | 6/2011 | Jung et al. |
| 2011/0193939 A1 | 8/2011 | Vassigh et al. |
| 2011/0267314 A1 | 11/2011 | Huang |
| 2013/0286152 A1* | 10/2013 | Hojer ..................... H04N 7/144 348/14.01 |

OTHER PUBLICATIONS

Hoshi, T., "Midair Input-Output Interface Consisting of Depth Camera and Noncontact Tactile Display," SICE Annual Conference, Sep. 13-18, 2011, pp. 608-609.
Treskunov, A. et al., "Range Camera for Simple behind Display Interaction," MVA2011, IAPR Conference on Machine Vision Applications, Jun. 13-15, 2011, pp. 160-163.
Wilson, A. D., "Using a Depth Camera as a Touch Sensor," ITS 2010: Devices & Algorithms, Nov. 7-10, 2010, pp. 69-72.
International Search Report and Written Opinion of PCT/CN13/75602, dated Feb. 20, 2014.

* cited by examiner

DETECTION OF USER GESTURES

CROSS REFERENCE TO RELATED APPLICATIONS

The present application is a continuation application under 35 U.S.C. § 120 of U.S. application Ser. No. 14/422,287, filed on Feb. 18, 2015, entitled "DETECTION OF USER GESTURES," which in turn is a U.S. National Stage filing under 35 U.S.C. § 371 of International Application No. PCT/CN2013/075602, filed on May 14, 2013, entitled "DETECTION OF USER GESTURES." The disclosures of U.S. application Ser. No. 14/422,287 and International Application No. PCT/CN2013/075602, including any appendices or attachments thereof, are hereby incorporated by reference in their entirety.

TECHNICAL FIELD

The embodiments described herein pertain generally to determining a position and depth of a user, relative to a display device, to receive gesture and touch input.

BACKGROUND

Touchscreens have been increasing in deployment for interactive devices. However, resistive and capacitive touchscreens have been found to have lacking with regard to touch sensitivity, accuracy, and stability. Such touchscreens also entail significant costs, particularly as screen sizes increase. Further still, optical touchscreens are regarded as lacking in robust responsiveness, and also entail significant costs due to complex design and manufacturing requirements.

SUMMARY

In one example embodiment, a system may comprise a display including a display screen; a display controller configured to display visual information on the display screen of the display screen, control at least portions of one or more pixels corresponding to the display screen to render the display screen transparent; and a depth camera, positioned behind the display screen, configured to obtain depth image information of one or more objects in front of the display screen when at least portions of the one or more pixels are rendered transparent.

In another example embodiment, a method may comprise obtaining depth image information including a number of distance values regarding at least one object located in front of an interactive display screen that includes one or more pixels that are configurable to be transparent, determining one or more triggering points based on the depth image information, reconciling the obtained distance information and the one or more determined triggering points, and executing one or more computer commands generated from the one or more triggering points.

In yet another example embodiment, a system may comprise a display to display visual information, a camera to collect interactive information, and a processor to execute at least one computer command based on the interactive information.

In still another example embodiment, a computer-readable medium may store instructions thereon that, when executed, cause one or more processors to perform operations, comprising: obtaining depth image information including a number of distance values regarding one or more triggering points in front of a display screen that includes one or more pixels that are configurable to be transparent; receiving status information, from a display controller, identifying areas of transparency; indicating the areas of transparency on the depth image information; and outputting the depth image information with the status information to a computing device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
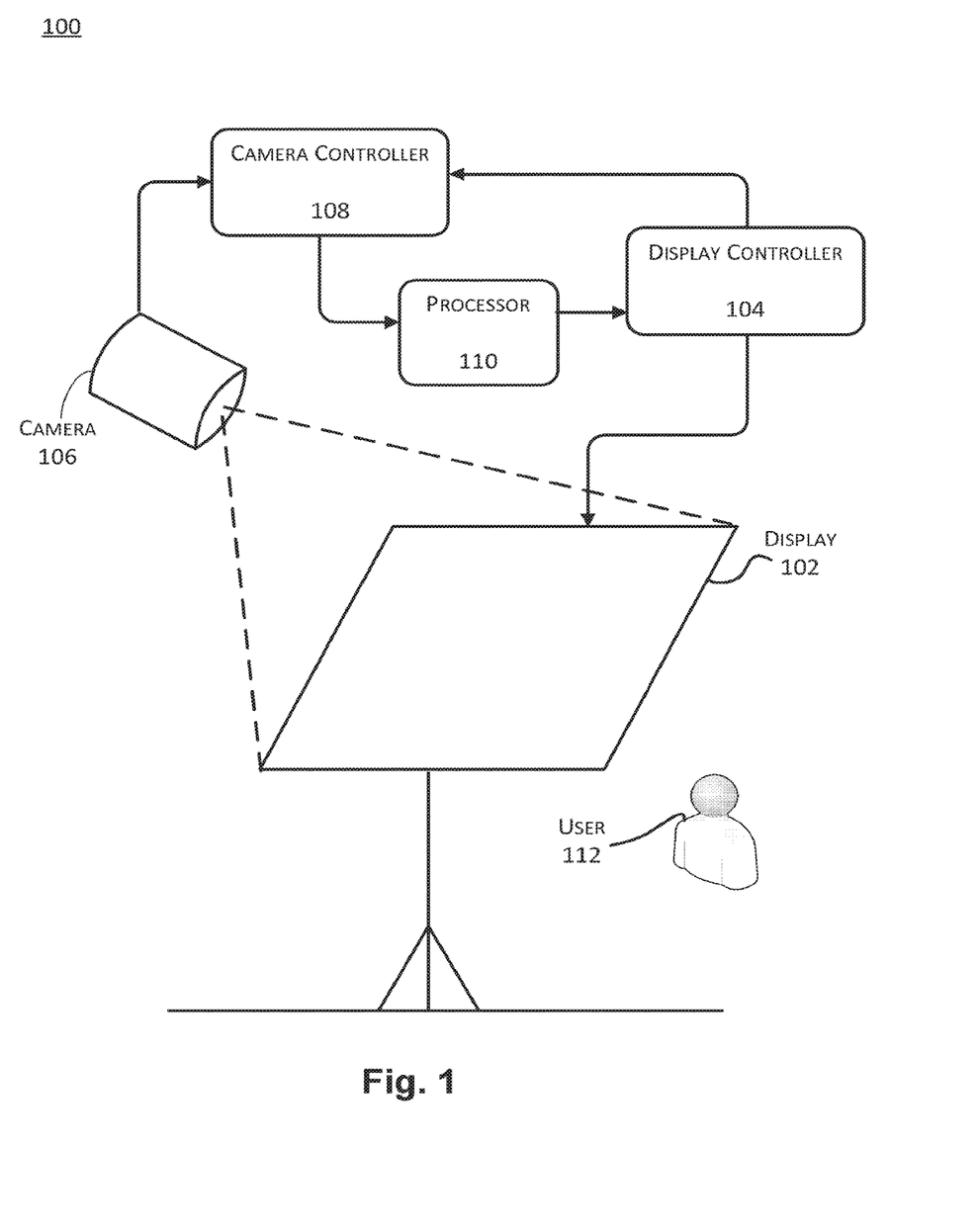
FIG. 1 shows an example system configuration in which detection of user gestures may be implemented, arranged in accordance with at least some embodiments described herein.

FIG. 1 shows an example system configuration 100 in which detection of user gestures may be implemented, arranged in accordance with at least some embodiments described herein. As depicted, configuration 100 includes, at least, a display 102, a display controller 104, a camera 106, a camera controller 108, and a processor 110.

In various embodiments, FIG. 1 illustrates a system in which detection of user gestures may be implemented by, at least, a display that is configured to display interactive video content, a camera controller that is configured to collect interactive information regarding one or more objects in front of the display, and a processor that is configured to execute at least one computer command based on the collected interactive information.

FIG. 1 further illustrates a system in which detection of user gestures may be implemented by, at least, a display having a display screen; a display controller that is configured to transmit interactive content to the display screen and to control one or more pixels corresponding to the display screen to render at least portions of the display screen transparent; a depth camera that is configured to capture an image of a person and/or one or more objects in front of the display screen when at least portions of the display screen are rendered transparent; and a camera controller that is configured to obtain depth image information of at least some of the person or object in the captured image.

Configuration 100 may be implemented as a media or computing system for which user interaction is recognized in the form of user touch input, e.g., multi-touch gestures, on a surface of display 102 or in the form of user motion relative to display 102. Thus, as utilized herein, "interactive" may be used to describe a system, website, application, etc., that incorporates real-time user input into programmable media content.

Display 102 may refer to a display device that is configured to display media content, e.g., interactive gaming content; online content, e.g., interactive websites; application content, e.g., word processing, email; other interactive content that may be presented via a graphical user interface; etc. At least portions of display 102, in accordance with various embodiments of detection of user gestures, may be further configured to be rendered transparent. That is, at intermittent time intervals, some or all portions of display 102 may be rendered temporarily transparent for periods of time such that the temporary transparency is undetectable to a human eye.

Display 102 may be deployed as a transparent, or even translucent, display surface that is configured to display interactive media content received from a content source, e.g., processor 110 via display controller 104. Accordingly, display 102 may include a configuration of individual pixels or multiple panels of pixels that may be individually, regionally, and/or collectively controlled to display the received interactive media content or to be transparent. Therefore, as referenced herein, a "portion" of display 102 may include one or more pixels, one or more regions of pixels, and/or the entire display surface of display 102. The temporary periods of transparency may be implemented by at least portions of display 102 temporarily halting display of the interactive media content or by the content source temporarily halting transmission of the interactive media content to one or more portions of display 102.

Display controller 104 may refer to a processing apparatus that is configured to transmit interactive media content to display 102 from a content source, e.g., processor 110. In accordance with various embodiments of detection of user gestures, display controller 104 may transmit, to display 102, interactive media content and one or more transparency instructions to instruct display 102 to render at least portions of display 102 transparent at the aforementioned intermittent time intervals. That is, display controller 104 may be configured to control one or more pixels or regions of pixels to render display 102 transparent, entirely or partially. The one or more transparency instructions may also be transmitted to camera controller 108 to indicate which portions of display 102 are rendered transparent at a given time, relative to the displayed interactive media content. Further, during those intermittent time intervals, at least portions of display 102 may be rendered transparent for periods of time such that the temporary transparency is undetectable to a human eye.

In accordance with at least one alternative embodiment, display controller 104 may intermittently halt transmission of some or all of the interactive media content to display 102. During those intermittent time intervals in which some or all of the interactive media content is not transmitted to display 102, at least portions of display 102 may be rendered transparent for periods of time such that the temporary transparency is undetectable to a human eye.

Camera 106 may refer to a depth camera that is deployed behind display 102, i.e., on the opposite side of display 102 from a user 112; and is configured to capture an image of a person, e.g., a user 112, and/or an object or objects that are located or positioned within a predetermined range of a 3-dimensional ("3-D") space in front of display 102 when at least portions of display 102 are rendered transparent. The captured image may then be transmitted to camera controller 108.

Camera controller 108 may refer to a processing apparatus that is configured to receive, from camera 106, one or more images, or video streams, of the person and/or an object or objects in front of display 102 captured when at least portions of display 102 are rendered transparent. Camera controller 108 may be further configured to obtain distance information of the person and/or object or objects in the received one or more captured images or video streams. That is, camera controller 108 may be configured to measure distance values and indicate location information, relative to display 102, for triggering points corresponding to the person and/or object or objects in front of display 102.

As a non-limiting example, camera controller 108 may obtain the distance information by comparing a reference image, which may be captured, e.g., when camera 106 is initiated, to the received one or more captured images or video streams. Features depicted in the reference image may be matched to coordinates of the individual pixels of display 102. As the reference image is compared to the captured images or video streams, the distance values may be measured using a geometrical analysis of the person and/or object or objects shown in the captured images or video streams. To obtain the distance information, camera controller 108, as well as camera 106, may utilize known techniques for detecting movement of the person and/or object or objects in front of display 102. Regardless, the measured distance values may be utilized to determine whether one or more triggering points are close enough to display 102 to be indicative of user input that is intended to be integrated into the displayed interactive media content; and the one or more captured images or video stream may be utilized to identify a user gesture or movement that may be interpreted as user input.

As referenced herein, a "triggering point" may refer to a body part that may be deemed to capable of rendering a gesture indicative of user input that is intended to be integrated into the displayed interactive media content. Non-limiting examples of a triggering point may include an individual finger, a forefinger and thumb in combination, a hand in its entirety, a wrist, an elbow, a head, a neck, at least one shoulder, or other joints and appendages of user 112. Further, triggering points in an image or video stream captured by camera 106 may include multiple people or inanimate objects that are controlled by a user who may or may not also be included in the captured image.

Camera controller 108 may be further configured to receive the one or more transparency instructions, from display controller 104, which may indicate which pixels or regions of pixels corresponding to display 102 are to be rendered transparent at a given time. Camera controller 108 may be further configured to then reconcile the measured distance values and identified location information of the triggering points, the received captured image or video streams of the person and/or object or objects in front of display 102, and the one or more transparency instructions from display controller 104 to determine whether a triggering point gesture may be interpreted as user input. As a non-limiting example, such reconciliation may include a binary inquiry for a triggering point within a predetermined threshold distance of a portion of display 102 at one of the intermittent times that the aforementioned portion of display 102 is instructed to be transparent. An absence of a triggering point in a captured image or video stream at one of the intermittent times of at least partial display transparency may be interpreted as the absence of user interaction; conversely, a presence of a triggering point in a captured image or video stream at one of the intermittent times of at least partial display transparency may be interpreted as user input. Camera controller 108 may be further configured to transmit the reconciled data to processor 110.

Processor 110 may refer to a processing device that is configured to provide interactive media content to display 102, directly or via display controller 104, and to further match or otherwise correspond a triggering point gesture that is interpreted as user input to a stored user command.

User 112 may be regarded as a person who may appear to be interacting with content displayed on display 102, but is actually interacting with the entirety of configuration 100.

Figure 2:
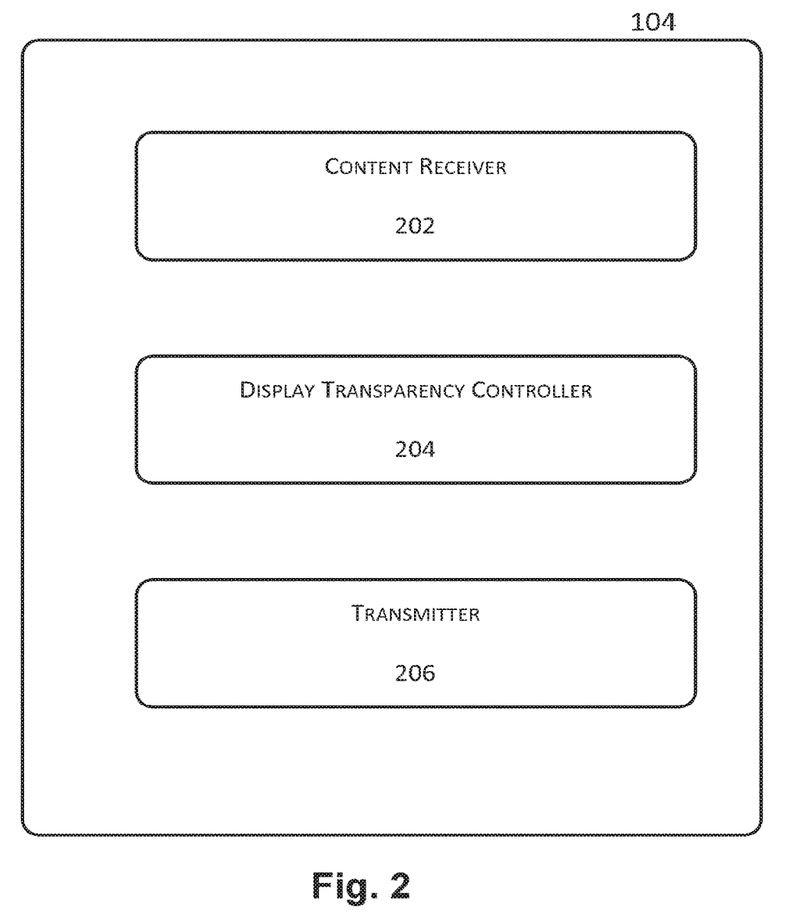
FIG. 2 shows an example configuration of a display controller for detection of user gestures, arranged in accordance with at least some embodiments described herein.
Figure 3:
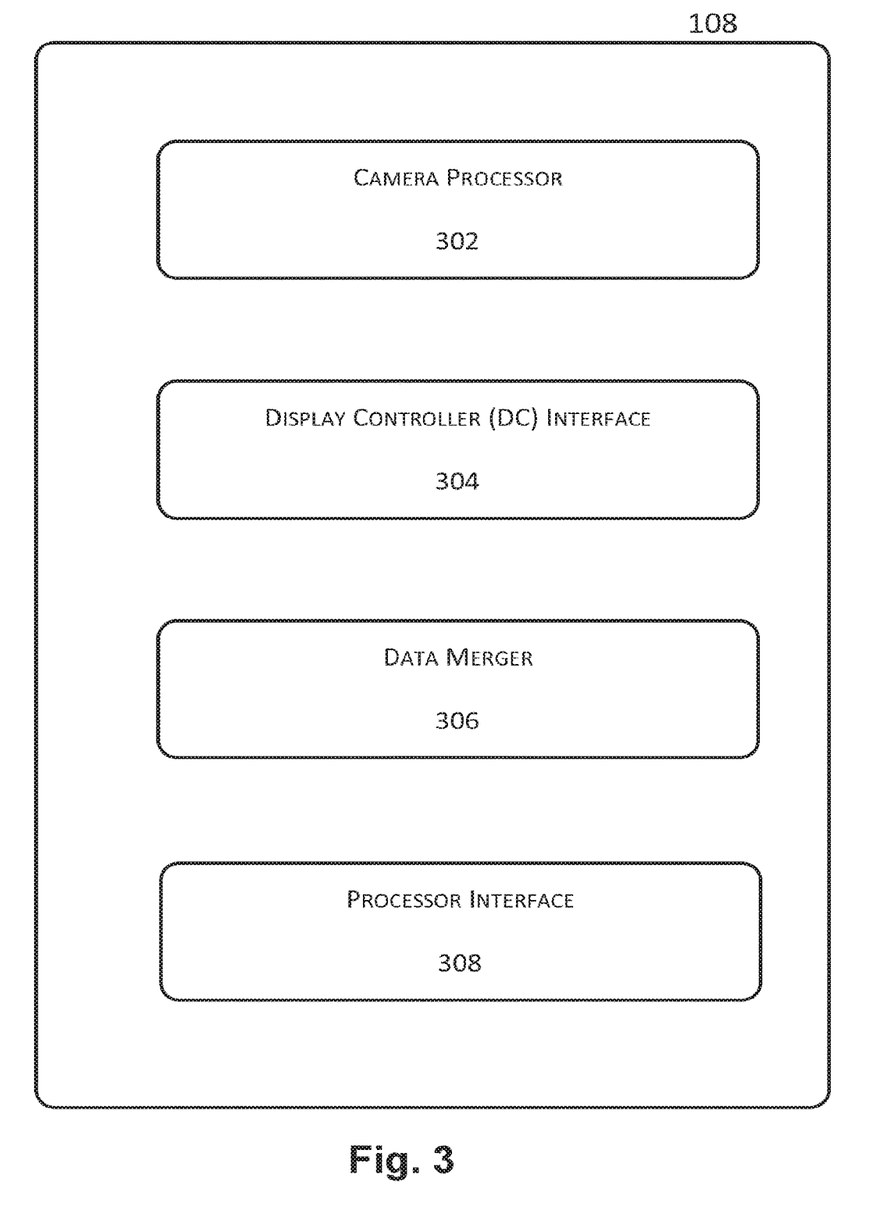
FIG. 3 shows an example configuration of a camera controller for detection of user gestures, arranged in accordance with at least some embodiments described herein.
Figure 4:
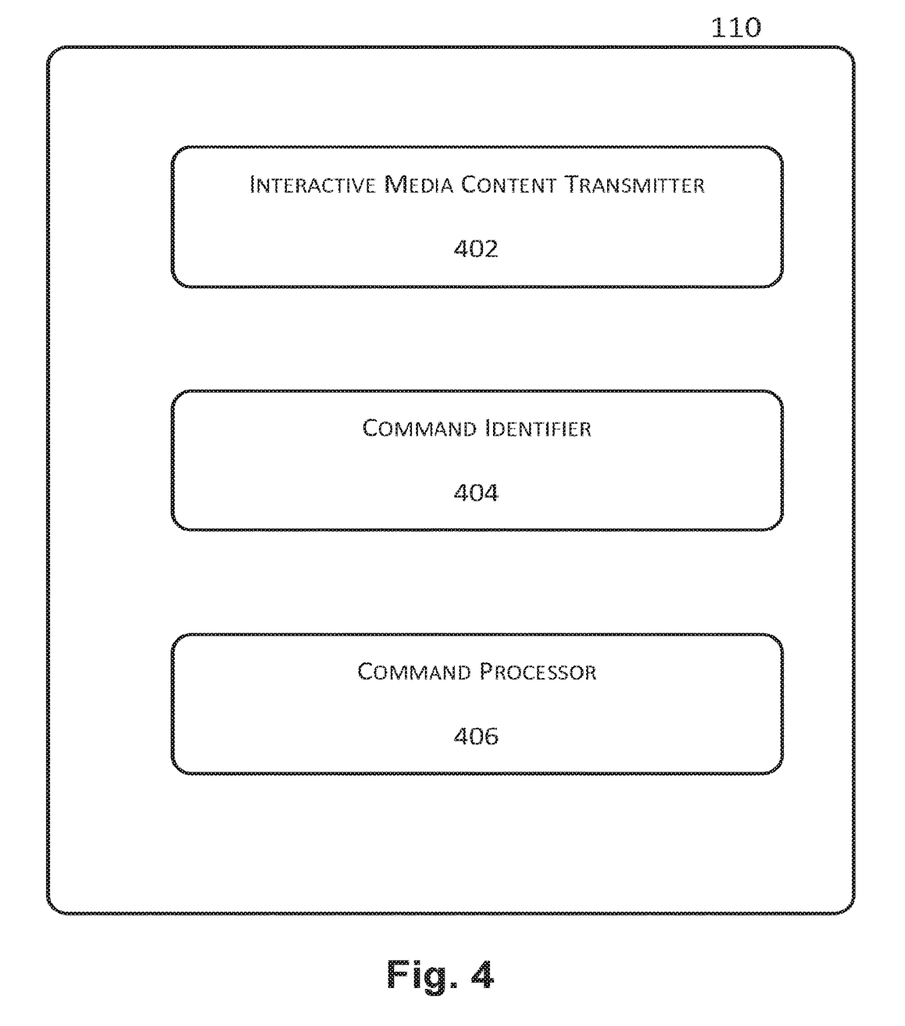
FIG. 4 shows an example configuration of a processor for detection of user gestures, arranged in accordance with at least some embodiments described herein.

FIGS. 2-4, descriptions of which follow, show example features depicted in example configuration 100 of FIG. 1, arranged in accordance with at least some embodiments described herein. The aforementioned features may be implemented as hardware, software, firmware, or various combinations thereof. Thus, the features are illustrated and described as discrete components or modules within the respective figures. It should be noted, though, that various components or modules may be divided into additional components or modules, combined into fewer components or modules, or eliminated altogether, depending on the desired implementation. Further, the various features depicted and described with regard to FIGS. 2-4 may be combined in various permutations and combinations, and therefore one or more of the components or modules depicted and described with regard to FIGS. 2-4 may be combined in various permutations and combinations.

FIG. 2 shows an example configuration of display controller 104 for detection of user gestures, arranged in accordance with at least some embodiments described herein. As depicted, the example configuration of display controller 104 includes a content receiver 202, a display transparency controller 204, and a transmitter 206. However, this configuration is an example only, and is not intended to be limiting in any manner.

Content receiver 202 may refer to a component or module that is configured, designed, and/or programmed to receive, from, e.g., processor 110, interactive media content that is to be displayed on display 102. Non-limiting examples of such interactive media content may include interactive gaming content, other media content that incorporates that real-time interactive user interface, etc.

Display transparency controller 204 may refer to a component or module that is configured, designed, and/or programmed to generate one or more transparency instructions to instruct display 102 to be rendered transparent, entirely or in specified portions thereof, at intermittent time intervals. Thus, the one or more transparency instructions generated by display transparency controller 204 may designate one or more pixels, one or more regions of pixels, and/or the entire display surface of display 102 to be rendered transparent for periods of time such that the intermittent transparency is undetectable to a human eye. The transparency instructions may indicate coordinates of individual pixels of display 102 to be transparent at a given time, in synchronism with portions of the displayed interactive media content for which user input may be warranted.

The frequency of the intermittent time intervals during which at least portions of display 102 are instructed to be rendered transparent may be dependent upon the interactive media content received by content receiver 202. That is, the interactive media content received by content receiver 202 may include programmable code that facilitates user interaction, e.g., Dance Dance Revolution®, by which a user's responses to displayed catalysts are constant. Thus, the programmable code may include instructions for at least portions of display 102 to be rendered transparent at a high frequency in order to capture triggering point input from user 112, which may have a high rate of occurrence. Alternatively, the programmable code for an interactive game for which a user's responses to displayed catalysts are infrequent, e.g., chess, may include instructions for at least portions of display 102 to be rendered transparent at a low frequency.

In accordance with at least one alternative embodiment, display transparency controller 204 may provide instructions to transmitter 206 to intermittently halt transmission of some or all of the interactive media content to one or more pixels, one or more regions of pixels, and/or the entire display surface of display 102. During those intermittent time intervals in which some or all of the interactive media content is not transmitted to display 102 or at least portions thereof, at least those portions of display 102 may be rendered transparent for periods of time such that the temporary transparency is undetectable to a human eye. Accordingly, images or video streams of user 112 and/or an inanimate object or objects in front of display 102 may be captured by camera 106.

Transmitter 206 may refer to a component or module that is configured, designed, and/or programmed to transmit, to display 102, the interactive media content that is received by content receiver 202. Further, transmitter 206 may be configured, designed, and/or programmed to transmit, to display 102, the one or more transparency instructions to instruct display 102 to render transparent the aforementioned one or more pixels, one or more regions of pixels, and/or the entire display surface of display 102 at predetermined times for respective periods of time such that the intermittent transparency is undetectable to a human eye. Further still, transmitter 206 may be configured, designed, and/or programmed to transmit, to camera controller 108, the one or more transparency instructions to indicate which pixels, regions of pixels, and/or the entire display surface of display 102 are rendered transparent at a predetermined time in order for images or video streams of user 112 and/or an inanimate object or objects in front of display 102 to be captured by camera 106.

Thus, FIG. 2 illustrates a display controller that implements at least portions of detection of user gestures.

FIG. 3 shows an example configuration of camera controller 108, arranged in accordance with at least some embodiments of detection of user gestures described herein. As depicted, the example configuration of camera controller 108 includes a camera processor 302, a display controller interface (hereafter "DC interface") 304, data merger 306, and processor interface 308. However, this configuration is an example only, and is not intended to be limiting in any manner.

Camera processor 302 may refer to a component or module that is configured, designed, and/or programmed to receive, from camera 106, still images or video streams of the person and/or object or objects in front of display 102, captured when at least portions of display 102 are rendered transparent. Camera processor 302 may be further configured to obtain, compute, or determine distance information of the person and/or object or objects in the received one or more captured images and/or video streams. That is, camera processor 302 may be configured to measure distance values and indicate location information, relative to display 102, for triggering points corresponding to the person and/or object or objects in front of display 102, using known methodologies.

DC interface 304 may refer to a component or module that is configured, designed, and/or programmed to receive the one or more transparency instructions, from display controller 104, which may indicate which pixels or regions of pixels of display 102 are to be rendered transparent at a given time in order for images or video streams of user 112 and/or an inanimate object or objects in front of display 102 to be captured by camera 106.

Data merger 306 may refer to a component or module that is configured, designed, and/or programmed to reconcile the received captured image of the person and/or object or objects in front of display 102, the measured distance values and identified location information of the triggering points relative to display 102, as obtained, computed, or determined by camera processor 302, and the one or more transparency instructions, received by DC interface 304, to determine whether a triggering point gesture may be interpreted as user input. Data merger 306 may utilize the measured distance values to determine whether one or more triggering points are close enough to display 102 to be indicative of user input at a time of transparency for display 102. Data merger 306 may further utilize the captured image to indicate a triggering point gesture that may be interpreted as user input.

Processor interface 308 may refer to a component or module that is configured, designed, and/or programmed to transmit the reconciled data, including the identified triggering point gesture or movement, to processor 110.

Thus, FIG. 3 illustrates a camera controller that implements at least portions of detection of user gestures.

FIG. 4 shows an example configuration of processor 110, arranged in accordance with at least some embodiments of detection of user gestures described herein. As depicted, the example configuration of processor 110 includes an interactive media content transmitter 402, command identifier 404, and a command processor 406. This configuration is an example only, and is not intended to be limiting in any manner.

Interactive media content transmitter 402 may refer to a component or module that is configured, designed, and/or programmed transmit interactive media content to display 102, via display controller 104. Alternative embodiments may contemplate interactive media content transmitter 402 transmitting the interactive media content to display 102 directly.

Command identifier 404 may refer to a component or module that is configured, designed, and/or programmed to receive, from processor interface 308, the reconciled data that includes at least the identified triggering point gesture, and to match or otherwise correspond the user input to a stored user command.

Command processor 406 may refer to a component or module that is configured, designed, and/or programmed to implement the user command, matched by command identifier 404 to the identified triggering point gesture, in the present context of the interactive media content displayed on display 102.

Thus, FIG. 4 illustrates a processor that implements at least portions of detection of user gestures.

Figure 5:
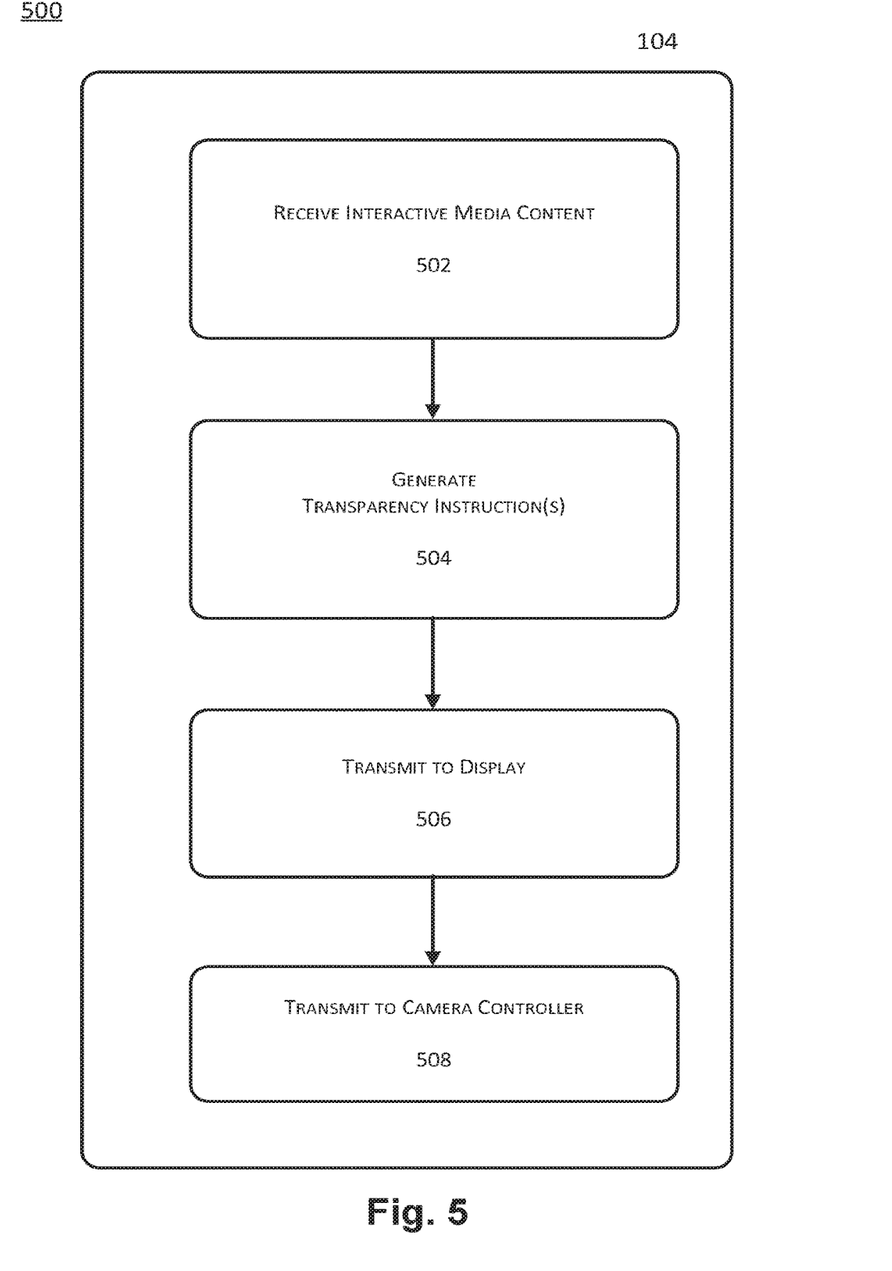
FIG. 5 shows an example processing flow of operations implemented by a display controller for detection of user gestures, arranged in accordance with at least some embodiments described herein.
Figure 6:
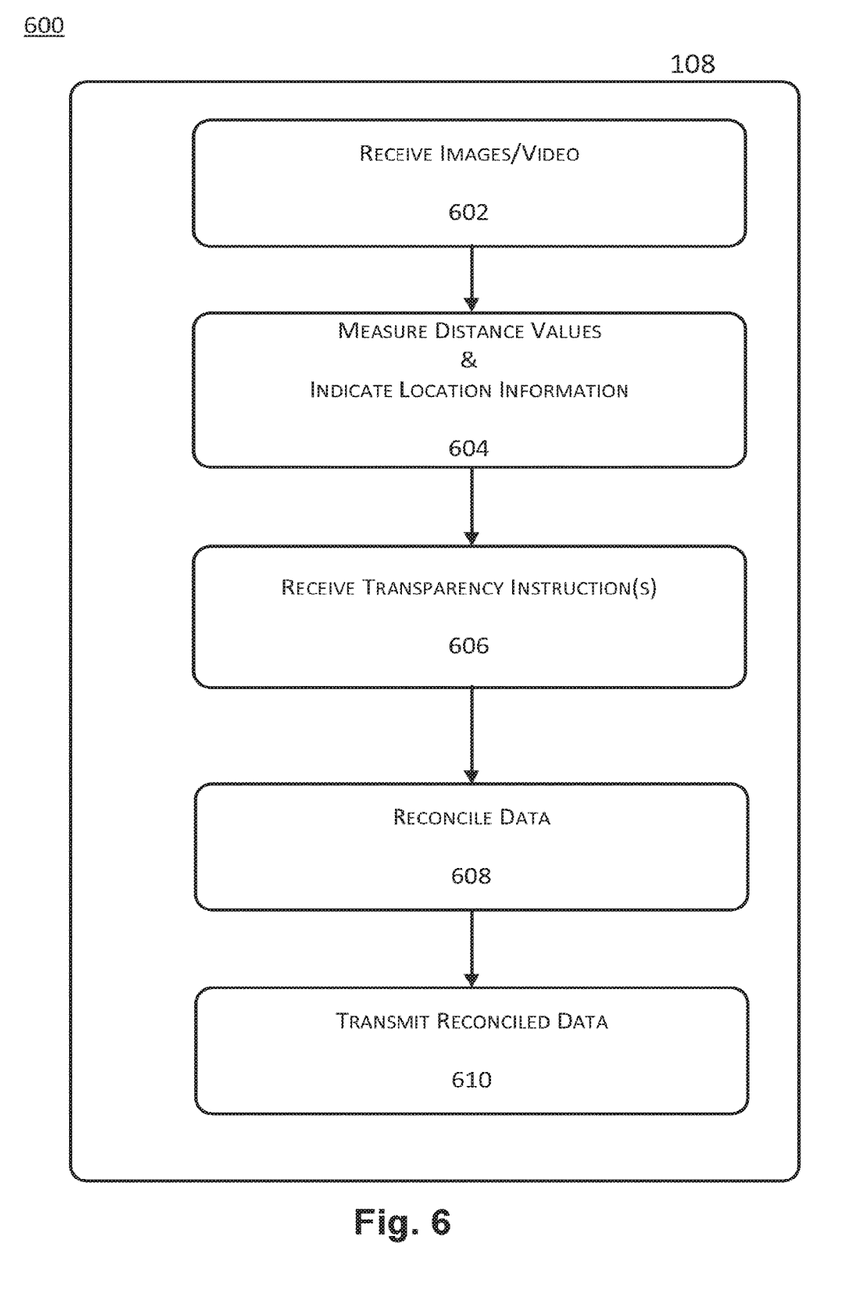
FIG. 6 shows an example processing flow of operations implemented by a camera controller for detection of user gestures, arranged in accordance with at least some embodiments described herein.
Figure 7:
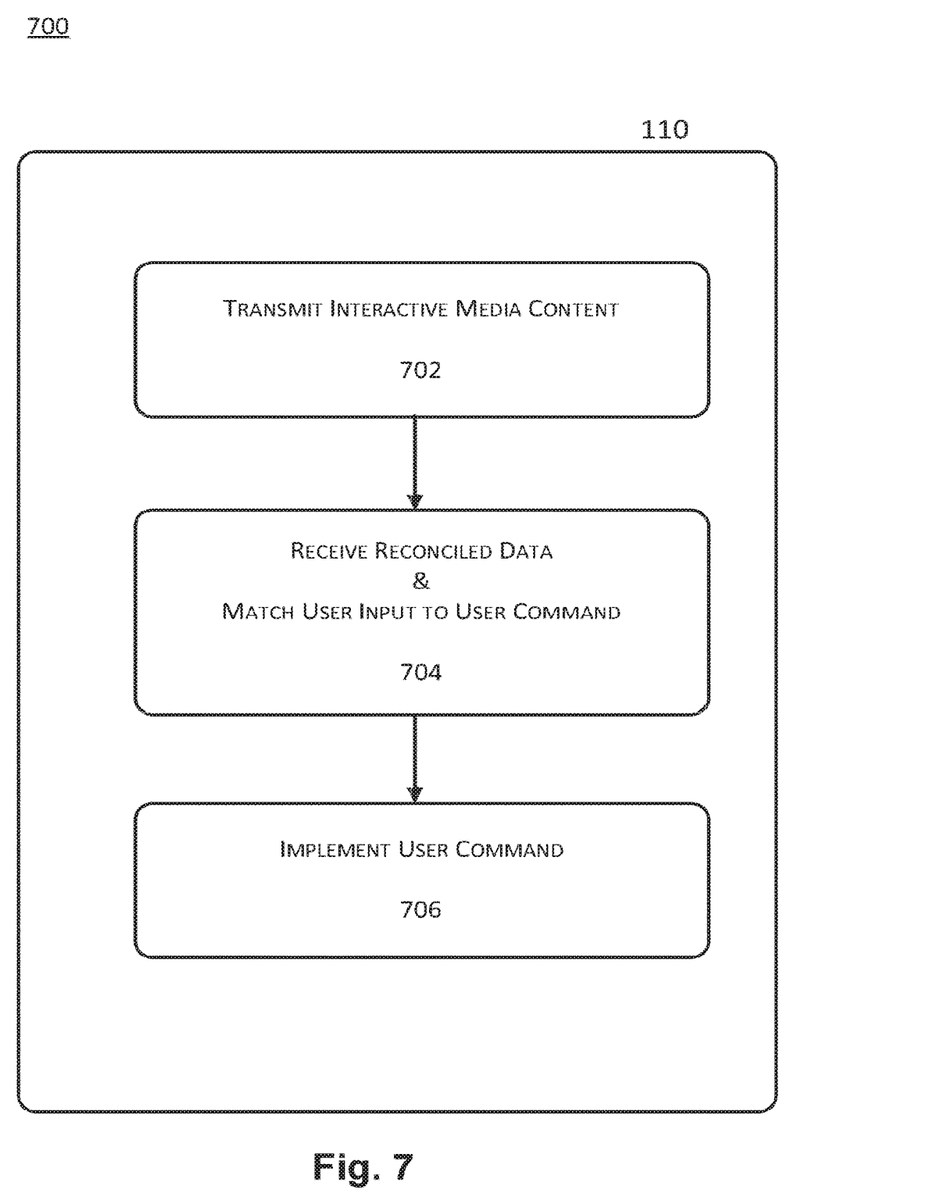
FIG. 7 shows an example processing flow of operations implemented by a processor for detection of user gestures, arranged in accordance with at least some embodiments described herein.

FIGS. 5-7, descriptions of which follow, show example processing flows implemented by various features depicted in example configuration 100 of FIG. 1, in accordance with at least some embodiments of detection of user gestures described herein. Although illustrated as discrete blocks within the respective figures, various blocks may be divided into additional blocks, combined into fewer blocks, or eliminated, depending on the desired implementation. Further, since the various features depicted and described with regard to FIGS. 2-4 may be combined in various permutations and combinations, as set forth above, it follows that one or more operations depicted and described with regard to FIGS. 5-7 may likewise be combined in various permutations and combinations.

Thus, in concert, FIGS. 5-7 depict at least one example processing flow for detection of user gestures by which operations include, at least, obtaining depth image information, including a number of distance values regarding at least one object located in front of an interactive display screen that includes one or more pixels that are configurable to be transparent; determining one or more triggering points based on the depth image information; reconciling the obtained depth information and the one or more determined triggering points; and executing one or more computer commands generated from the one or more triggering points.

FIG. 5 shows an example processing flow 500 of operations implemented by a display controller, arranged in accordance with at least some embodiments of detection of user gestures described herein. Processing flow 500 may be implemented by, e.g., display controller 104, which may include content receiver 202, display transparency controller 204, and transmitter 206. Processing flow 500 may include one or more operations, actions, or functions depicted by one or more blocks 502, 504, 506, and 508. Although illustrated as discrete blocks, various blocks may be divided into additional blocks, combined into fewer blocks, or eliminated, depending on the desired implementation. Processing flow 500 may begin at block 502.

Block 502 (Receive Interactive Media Content) may refer to content receiver 202 receiving interactive media content that is to be displayed on display 102. The interactive media content may be received from, e.g., processor 110, and may include, e.g., interactive gaming content; online content, such as interactive websites; application content, such as word processing, email; other interactive content that may be presented via a graphical user interface; etc. Processing flow 500 may proceed from block 502 to block 504.

Block 504 (Generate Transparency Instruction(s)) may refer to display transparency controller 204 generating one or more transparency instructions to instruct one or more pixels, one or more regions of pixels, and/or the entire display surface of display 102 to be rendered transparent at intermittent time intervals. Block 504 may alternatively refer to display transparency controller 204 providing one or more transparency instructions to transmitter 206 to intermittently halt transmission of some or all of the interactive media content to one or more pixels, one or more regions of pixels, and/or the entire display surface of display 102.

Regardless of the embodiment, the one or more transparency instructions may designate one or more pixels, one or more regions of pixels, and/or the entire display surface of display 102 to be rendered transparent for periods of time such that the intermittent transparency is undetectable to a human eye in order for images or video streams of user 112 and/or an inanimate object or objects in front of display 102 to be captured by camera 106. Further, the frequency of the intermittent time intervals during which at least portions of display 102 are instructed to be rendered transparent may depend upon an anticipated rate of user interaction with the received interactive media content, which may be reflected in the programmable code thereof, which facilitates user interaction. Processing flow 500 may proceed from block 504 to block 506.

Block 506 (Transmit to Display) may refer to transmitter 206 transmitting, to display 102, the interactive media content that is received by content receiver 202, as well as the one or more transparency instructions to instruct one or more pixels, one or more regions of pixels, and/or the entire display surface of display 102 to be rendered transparent at predetermined times for respective periods of time. Processing flow 500 may proceed from block 506 to block 508.

Block 508 (Transmit to Camera Controller) may refer to transmitter 206 further transmitting, to camera controller 108, the one or more transparency instructions to indicate which pixels or regions of pixels of display 102 are transparent at a predetermined time.

Thus, FIG. 5 shows an example processing flow, by which at least a portion of detection of user gestures may be implemented.

FIG. 6 shows an example processing flow 600 of operations implemented by a camera controller, arranged in accordance with at least some embodiments of detection of user gestures described herein. Processing flow 600 may be implemented by, e.g., camera controller 108, which may include camera processor 302, DC interface 304, data merger 306, and processor interface 308. Processing flow 600 may include one or more operations, actions, or functions depicted by one or more blocks 602, 604, 606, 608, and 610. Although illustrated as discrete blocks, various blocks may be divided into additional blocks, combined into fewer blocks, or eliminated, depending on the desired implementation. Processing flow 600 may begin at block 602.

Block 602 (Receive Images/Video) may refer to camera processor 302 receiving, from camera 106, one or more still images or video streams of the person and/or object or objects in front of display 102, captured when at least portions of display 102 are rendered transparent. Processing flow 600 may proceed from block 602 to block 604.

Block 604 (Measure Distance Values & Indicate Location Information) may refer to camera processor 302 further obtaining, computing, or determining distance information of the person and/or object or objects in front of display 102, as depicted in the received one or more captured images or video streams. The obtained/computed/determined distance values and identified location information may pertain to triggering points corresponding to the person and/or object or objects in front of display 102 relative to display, using known methodologies. That is, camera processor 302 may utilize conventional or improved techniques for measuring relative distances among a person or object or objects in captured images using scaled coordinates. Processing flow 600 may proceed from block 604 to block 606.

Block 606 (Receive Transparency Instruction(s)) may refer to DC interface 304 receiving the one or more transparency instructions from display controller 104. As stated previously, the one or more transparency instructions may indicate which pixels or regions of pixels of display 102 are to be rendered transparent at a given time. Processing flow 600 may proceed from block 606 to block 608.

Block 608 (Reconcile Data) may refer to data merger 306 reconciling the received captured image of the person and/or object or objects in front of display 102, the measured distance values and identified location information of the triggering points relative to display 102, and the one or more transparency instructions, to determine whether a triggering point gesture may be interpreted as user input. Block 608 may further include data merger 306 utilizing the measured distance values to determine whether one or more triggering points are close enough to display 102 to be indicative of user input at a time of transparency for display 102. Accordingly, the captured image may be utilized to indicate a triggering point gesture that may be interpreted as user input. Processing flow 600 may proceed from block 608 to block 610.

Block 610 (Transmit Reconciled Data) may refer to processor interface 308 transmitting the reconciled data, including the identified user gesture or movement, to processor 110.

Thus, FIG. 6 shows an example processing flow, by which at least a portion of detection of user gestures may be implemented.

FIG. 7 shows an example processing flow 700 of operations implemented by a processor, arranged in accordance with at least some embodiments of detection of user gestures described herein. Processing flow 700 may be implemented by, e.g., processor 110, which may include content interactive media content transmitter 402, command identifier 404, and command processor 406. Processing flow 700 may include one or more operations, actions, or functions depicted by one or more blocks 702, 704, and 706. Although illustrated as discrete blocks, various blocks may be divided into additional blocks, combined into fewer blocks, or eliminated, depending on the desired implementation. Processing flow 700 may begin at block 702.

Block 702 (Transmit Interactive Media Content) may refer to interactive media content transmitter 402 providing interactive media content to display 102, via display controller 104, including, e.g., interactive gaming content; online content, such as interactive websites; application content, such as word processing, email; other interactive content that may be presented via a graphical user interface; etc. Processing flow 700 may proceed from block 702 to block 704.

Block 704 (Receive Reconciled Data & Match User Input to User Command) may refer to command identifier 404 receiving, from processor interface 308, the reconciled data that includes at least the identified triggering point gesture, matching or otherwise associating the user input to a stored user command that is relevant to the displayed interactive media content.

Block 706 (Implement User Command) may refer to command processor 406 implementing or otherwise activating the user command, matched by command identifier 404 to the identified triggering point gesture, in the present context of the interactive media content displayed on display 102.

Thus, FIG. 7 shows an example processing flow, by which at least a portion of detection of user gestures may be implemented.

Figure 8:
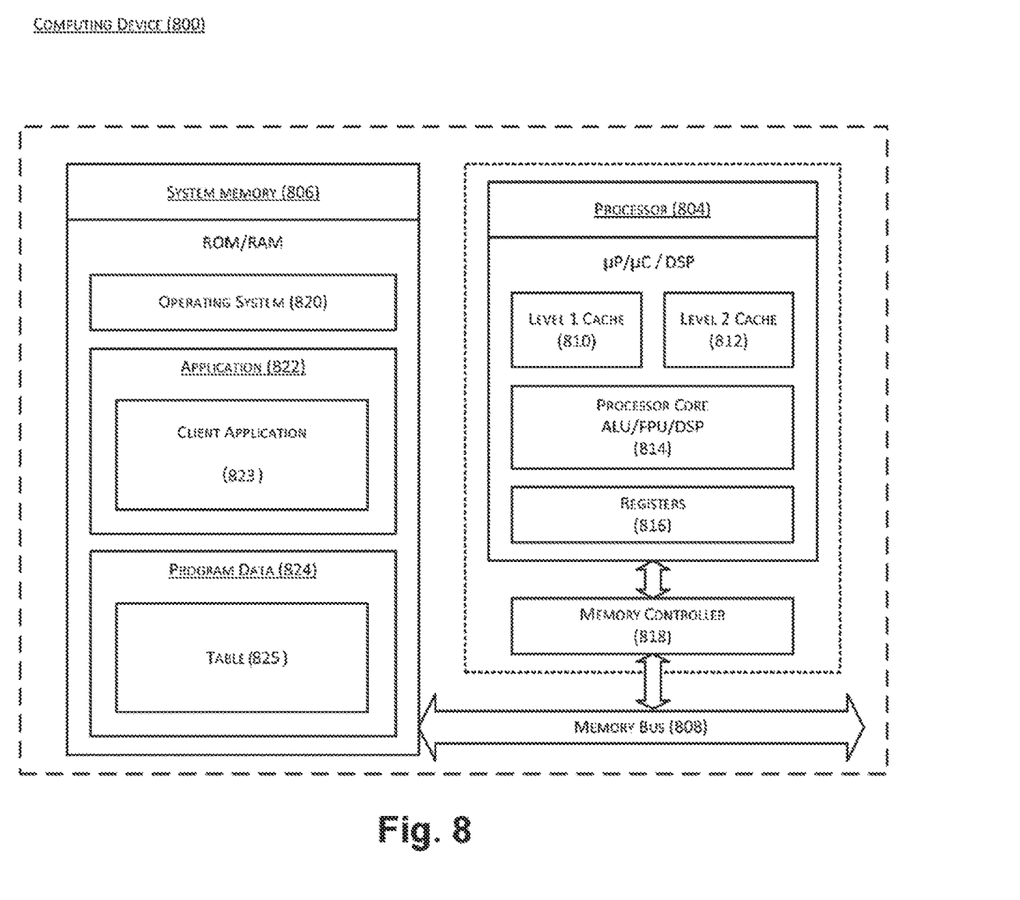
FIG. 8 shows a block diagram illustrating an example computing device by which various example solutions described herein may be implemented, arranged in accordance with at least some embodiments described herein.

FIG. 8 shows a block diagram illustrating an example computing device by which various example solutions described herein may be implemented, arranged in accordance with at least some embodiments described herein.

More particularly, FIG. 8 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for transactional permissions.

In a very basic configuration, a computing device 800 may typically include one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. The processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP core), or any combination thereof. An example memory controller 818 may also be used with the processor 804, or in some implementations, the memory controller 818 may be an internal part of the processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, one or more applications 822, and program data 824.

Application 822 may include a client application 823 which may be configured to transmit or receive identification information pertaining to display controller 104, camera controller 108, and/or processor 110, as described previously with respect to FIGS. 1-7. Program data 824 may include a table 825, which may be useful for implementing actuation of appropriate components or modules as described herein, such as, e.g., storing one or more user commands that may correspond to detected gestures.

System memory 806 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disc (CD), a digital versatile disc (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
halting intermittently, at particular points in time, a transmission of interactive media content that is to be displayed on a display screen, to render one or more regions of the display screen transparent for particular time periods, wherein a number of the particular points in time is determined based, at least in part, on an anticipated rate of user interaction with the interactive media content;

obtaining depth image information that includes a number of distance values regarding at least one object located in front of the display screen when the one or more regions of the display screen are rendered transparent;

determining one or more trigger points based on the depth image information;

reconciling the obtained number of distance values and the one or more determined trigger points to determine a user input; and executing one or more computer commands that correspond to the determined user input.

2. The method of claim 1, wherein the determining the one or more trigger points includes:

measuring the distance values of the at least one object when the transmission of the interactive media content is intermittently halted;

selecting the one or more trigger points from the at least one object;

outputting the number of distance values of the one or more trigger points to a processor;

determining a movement associated with the one or more trigger points as the user input, wherein the one or more trigger points are indicative of the user input that is to be integrated into the displayed interactive media content; and associating the movement with the user input relative to the interactive media content presently displayed on the display screen.

3. The method of claim 2, wherein the measuring the distance values includes comparing a reference image, which is captured after a camera is initiated, to an image that is captured through the camera when the one or more regions of the display screen are rendered transparent.

4. The method of claim 1, wherein the halting intermittently the transmission of the interactive media content includes halting intermittently the transmission of the interactive media content to render the one or more regions of the display screen transparent for the particular time periods such that the transparency of the display screen is undetectable to a human eye.

5. The method of claim 1, further comprises capturing an image of the at least one object when the one or more regions of the display screen are rendered transparent.

6. The method of claim 1, wherein the halting intermittently the transmission of interactive media content includes halting intermittently a transmission of a portion of the interactive media content.

7. The method of claim 1, wherein the halting intermittently the transmission of interactive media content includes halting intermittently a transmission of all the interactive media content.

8. A system, comprising:
a display that includes a display screen;
a display controller that is communicatively coupled to the display, wherein the display controller is configured to:
transmit interactive media content to display the interactive media content on the display screen;
halt intermittently, at particular points in time, transmission of a portion of the interactive media content, to render one or more portions of the display screen transparent for particular time periods; and
transmit transparency instructions to indicate the one or more portions of the display screen that are rendered transparent;

a camera controller, communicatively coupled to the display controller, configured to:
obtain the transparency instructions to control a depth camera to capture an image of one or more objects that are located in front of the display screen; and
obtain depth image information of the one or more objects in the captured image; and the depth camera, deployed behind the display screen and communicatively coupled to the camera controller, configured to capture the image of the one or more objects when the one or more portions of the display screen are rendered transparent.

9. The system of claim 8, wherein the camera controller is further configured to measure distance values and identify location information, relative to the display, for one or more trigger points that correspond to at least one of the one or more objects.

10. The system of claim 9, wherein the camera controller is further configured to reconcile data that includes: the measured distance values and the identified location information for the one or more trigger points, the captured image of the one or more objects, and the transparency instructions to determine whether a trigger point gesture is interpreted as a user input.

11. The system of claim 10, wherein the camera controller is further configured to determine the user input from the reconciled data, in response to a presence of the trigger point gesture at one of the particular time periods when the one or more portions of the display screen are rendered transparent.

12. The system of claim 10, further comprising a processor configured to obtain the reconciled data from the camera controller.

13. The system of claim 12, wherein the processor is further configured to match the user input to a stored user command.

14. The system of claim 13, wherein the processor is further configured to execute, in response to the match, the stored user command in a present context of the displayed interactive media content.

15. The system of claim 9, wherein the camera controller is configured to measure the distance values by comparison of a reference image, which is captured after the depth camera is initiated, with the captured image.

16. A device, comprising;
a display;
a processor configured to be in communication with the display, wherein the processor is effective to:
transmit interactive media content to display the interactive media content on the display, wherein the interactive media content includes programmable code that facilitates user interaction;
halt intermittently, at particular points in time, the transmission of the interactive media content to control one or more pixels that correspond to the display, to render at least a portion of the display transparent for particular time periods;
obtain depth image information that includes a number of distance values regarding at least one object that is located in front of the display when the interactive media content is intermittently halted;
obtain at least one gesture that is identified based on the number of distance values; and
execute one or more commands that correspond to the at least one gesture; and a camera configured to be in communication with the processor, wherein the camera is effective to capture one or more images or one or more video streams of the at least one object when at least the portion of the one or more pixels of the display are rendered transparent.

17. The device of claim 16, wherein the processor is further effective to match the at least one gesture that corresponds to a user input with a stored user command, and wherein the execution of the one or more commands includes execution of the stored user command, matched to the at least one identified gesture, in a present context of the interactive media content that is displayed on the display.

18. The device of claim 16, wherein the particular time periods are rendered transparent such that the transparency of the display is undetectable to a human eye.

19. The device of claim 16, wherein the at least one object includes a person, wherein the at least one gesture includes a user gesture or a movement of the person, and wherein the user gesture or the movement is rendered using body parts of the person in front of the display.

20. The device of claim 16, wherein the at least one object includes one or more inanimate objects controlled by a user of the device.

\* \* \* \* \*